United States Patent [19]
Röhm

[11] Patent Number: 4,991,860
[45] Date of Patent: Feb. 12, 1991

[54] DRILL CHUCK

[76] Inventor: Günter H. Röhm, Heinrich-Röhm-Strasse 50, D-7927 Sontheim, Fed. Rep. of Germany

[21] Appl. No.: 322,734

[22] Filed: Mar. 13, 1989

[30] Foreign Application Priority Data

Mar. 11, 1988 [DE] Fed. Rep. of Germany ....... 3808155

[51] Int. Cl.$^5$ .............................................. B23B 5/22
[52] U.S. Cl. ........................................ 279/62; 279/61; 279/1 K
[58] Field of Search .................. 279/60–64, 279/1 B, 1 R; 408/240

[56] References Cited

U.S. PATENT DOCUMENTS

| | | | |
|---|---|---|---|
| 893,348 | 7/1908 | Morrow | 279/60 |
| 933,179 | 9/1909 | Jacobs | 279/61 |
| 3,462,164 | 8/1969 | Wightman | 279/62 |
| 3,992,020 | 11/1976 | Derbyshire | 279/61 X |

FOREIGN PATENT DOCUMENTS

| | | | |
|---|---|---|---|
| 59030 | 9/1982 | European Pat. Off. | 279/61 |
| 2815026 | 4/1980 | Fed. Rep. of Germany. | |
| 3416986 | 10/1985 | Fed. Rep. of Germany. | |
| 242892 | 11/1946 | Switzerland | 279/63 |

*Primary Examiner*—Z. R. Bilinsky
*Assistant Examiner*—Robert Schultz
*Attorney, Agent, or Firm*—Herbert Dubno; Andrew Wilford

[57] ABSTRACT

Clamp jaws are arranged symmetrically about a rotation axis in a chuck body and guided in a direction inclined to the rotation axis. A tightening ring is mounted rotatable and axially nonslidable on the chuck body and is provided with a tightening thread for moving the clamp jaws which is engaged with a row of teeth on each of the clamp jaws. An opening for connection of a drill spindle is located in the tightening ring. As seen in a direction running from the drill spindle to the clamp jaws, the tightening thread has a direction of rotation, by which the clamp jaws are moved toward the drill tool or tighten on the drill tool in clockwise rotation of the tightening ring on the chuck body. Thus the drill chuck has aftertightening and selftightening properties.

3 Claims, 2 Drawing Sheets

DRILL CHUCK

Reference may also be had to my U.S. Pat. Nos.: 4,621,819, issued Nov. 11, 1986; 4,586,859, issued May 6, 1986; 4,627,628,issued Dec. 9, 1986; 4,619,461, issued Oct. 28, 1986; 4,621,820, issued Nov. 11, 1986; 4,621,818, issued Nov. 11, 1986; 4,658,912, issued Apr. 4, 1987; 627,626, issued Dec. 9, 1986; 4,602,799, issued July 29, 1986; 4,627,627, issued Dec. 9, 1986: 4,623,155, issued Nov. 18, 1986: 4,607,855, issued Aug. 26, 1986; 4,583,751,issued April 22, 1986; 4,609,199, issued Sept. 2, 1986; 4,773,657, issued Sept. 27, 1988; 4,664,568, issued May 22, 1987; 4,645,387, issued Feb. 22, 1987; 4,695,066, issued Sept. 22, 1987; 4,700,956, issued Oct. 20, 1987; 4,702,485,issued Oct. 27, 1987; 4,703,941, issued Nov. 3, 1987and 4,703,942, issued Nov. 3, 1987.

FIELD OF THE INVENTION

My present invention relates to a drill chuck and, more particularly to a selftightening drill chuck connectable to a drill spindle and adapted to engage a drill bit.

BACKGROUND OF THE INVENTION

A drill chuck connectable to a drill spindle is known comprising a plurality of clamp jaws forming between themselves a receptacle for a drill tool, a chuck body in which the clamp jaws are arranged symmetrically about the rotation axis and are guided in a direction inclined to the rotation axis, and a tightening ring mounted on the chuck body coaxial to the rotation axis, which is mounted rotatably by axially nonshiftable on the chuck body, and, for moving the clamp jaws, has a tightening thread coaxial with the rotation axis which is engaged with a row of teeth provided on each of the clamp jaws.

A drill chuck of this type, is for example, described in German Patent No. 34 16 986. In this dril chuck the threaded opening for mounting the chuck on the drill spindle is located in the chuck body and clamping of the drill tool is effected with the help of a chuck key insertable in the chuck body. The chuck has a pinion engageable in a toothed ring provided on the tightening ring. With the help of this chuck key the tightening ring can be rotated by the pinion on the key to open or close the drill chuck. An automatic aftertightening or self tightening of the drill tool is not possible in this drill chuck by the action of forces arising in drill operation.

By contrast to this type of chuck, an aftertightening or selftightening drill chuck has a basically different structure. In that drill chuck the clamp jaws are -located in a jaw holder separated from the drill chuck and guided on a conical surface of a tightening cone of the tightening ring so that the clamp jaws are movable radially to the axis of the drill tool receptacle by an axial relative motion between the tightening cone and the jaw holder.

The jaw holder is rotatable with a central threaded bolt on a tightening thread provided on the chuck body for axial relative motion. The jaw holder, the tightening jaws and the tightening ring are connected nonrotatably with each other.

In one such drill chuck described in German Patent No. 28 15 026, a clamping both manually with the tightening ring and also an automatic aftertightening by reaction moment of the drill tool during drill operation is possible, since the torque resistance of the drill tool causes a tightening motion by the clamp jaws in the jaw holder connected nonrotatably with them in the same way as the tightening ring.

OBJECTS OF THE INVENTION

It is an object of my invention to provide an improved drill chuck which has aftertightening and self-tightening properties and which can be tightened without a chuck key by hand, but which is especially easy to assemble.

It is also an object of my invention to provide an improved low-cost and relatively simple drill chuck which has aftertightening and selftightening properties and which can be automatically retightened in drill operation.

SUMMARY OF THE INVENTION

These objects and others which will become more readily apparent hereinafter are attained in accordance with my invention in a self-tightenable and aftertightenable drill chuck. According to my invention the tightening ring overlaps the end of the chuck body opposite the clamp jaws in the direction of the drill spindle and is provided with an opening for connection of the drill spindle and, as seen in a direction from the drill spindle to the clamp jaws, the tightening thread has a direction of rotation, by which the clamp jaws are moved to further clamp or to clamp the drill tool or bit on clockwise rotation of the tightening ring on the chuck body and in the direction which tightens the chuck on the spindle and the sense of spindle rotation for drilling operations.

Because of the above structure the torque on the drill spindle is transferred to the chuck body by the tightening ring through action of the tightening thread and to the drill tool by the clamp jaws guided in the chuck body. The torque also acts on the tightening ring and the tightening thread in the sense of clamping the drill tool. The reaction moment or torque of the drill tool thus leads to an automatic aftertightening of the drill chuck. Despite this automatic selftightening and aftertightening action the drill chuck according to my invention has a very simple structure, namely like that of a common simple ring gear drill chuck with only a chuck body, clamp jaws and tightening ring. The only difference from a conventional ring gear drill chuck is that the direction of rotation of the tightening thread is the reverse and the drill chuck is connected with the tightening ring instead of the chuck body to the drill spindle.

In the simplest embodiment of my invention the tightening sleeve has an opening for the drill spindle and a threaded ring divided in two parts circumferentially. The tightening thread is formed on the threaded ring and the halves of the threaded ring are guided in a circular groove in the chuck body intersecting guide passages for the clamp jaws and are held together by the tightening sleeve tensionally fitting together The threaded ring can be held axially unshiftably in the circular groove and the tightening sleeve can be guided in the vicinity of the opening for the drill spindle on the end of the chuck body.

In another advantageous embodiment of my invention the tightening ring has an indivisible single-piece threaded ring, on which the tightening thread is formed.

The chuck body has a maximum diameter equal to the inside diameter of the threaded ring in the region between the threaded ring and the drill spindle side of the chuck body, in which circular grooves in the tightening ring and in the chuck body positioned radially opposite each other are located.

These circular grooves together form a ring duct, in which, is located at least one locking member preventing the tightening ring from further axial displacement on the chuck body.

The undivided threaded ring in this embodiment need not be hard and can as a result be manufactured easily and very accurately and may be easily mounted on the chuck body. It can be pushed axially over the chuck body from the drill spindle end.

A cylindrical surface is preferably located for this purpose in the region of the drill-spindle end of the chuck body so that the space between the cylindrical surface and the tightening thread is advantageously as large as possible for good guiding of the tightening ring.

The guiding and rotating properties of the tightening ring can thus be improved so that the threaded ring has a cylindrical inner surface in front of the tightening thread on the drill side, with which it is guided on a suitable outer surface of the chuck body.

Advantageously the ring duct and the locking members are provided with a ball bearing in which the ring duct is the bearing race and the locking members are a plurality of bearing balls. Also a radially closable filling passage is provided in the wall of the tightening ring which opens into the ring duct and by which the bearing balls are fed in the ring duct. The minimal friction losses at the ball bearing has the consequence that the torque of the drill spindle is completely available for aftertightening on the tightening thread.

According to a further feature of my invention the tightening ring, as long as it is unsecured from axial sliding on the chuck body, is slidable axially toward the drill end for assembly purposes from its position in the secured state until the tightening thread is out of engagement with the row of teeth on the clamp jaws. Because of that mounting the undivided tightening ring is substantially speeded up and simplified. With the tightening ring pushed forward, the clamp jaws can be inserted from the front into the chuck body. If subsequently the tightening ring is returned to its final position, its tightening thread starts to engage on the clamp jaws, whereby the clamp jaws are pulled back automatically from the tightening ring in their final position engaged completely with the tightening ring.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
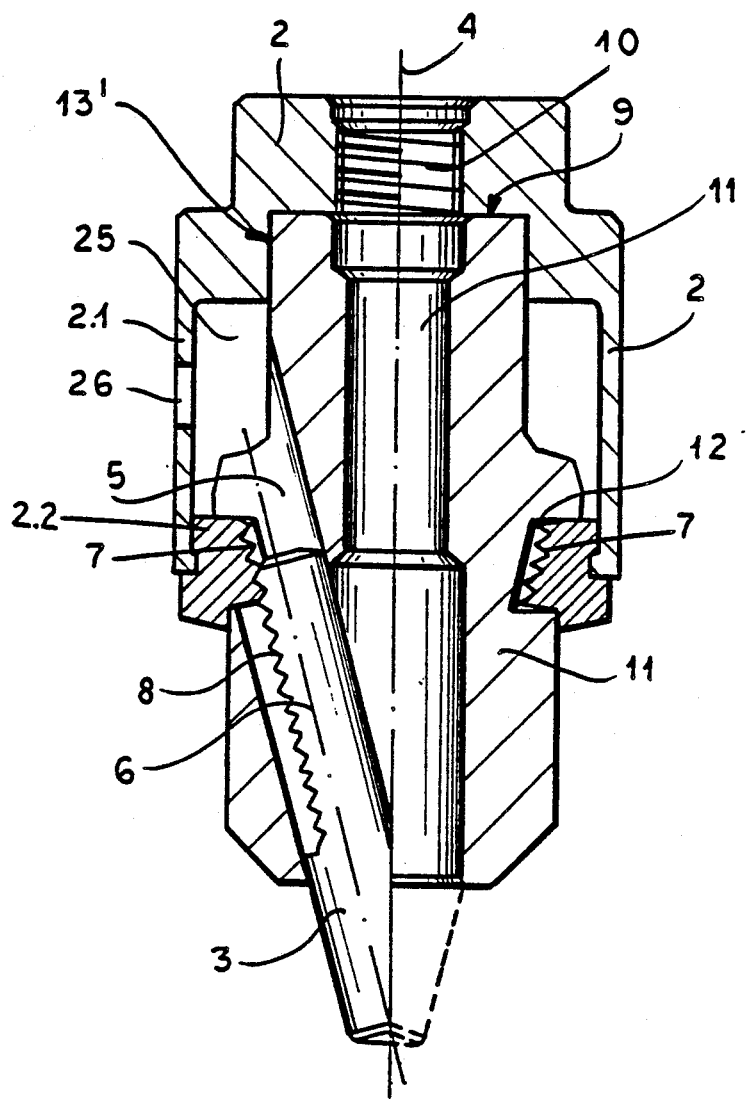
FIG. 1 is an axial cross sectional view through a drill chuck according to my invention with an axially divided threaded ring.
Figure 3:
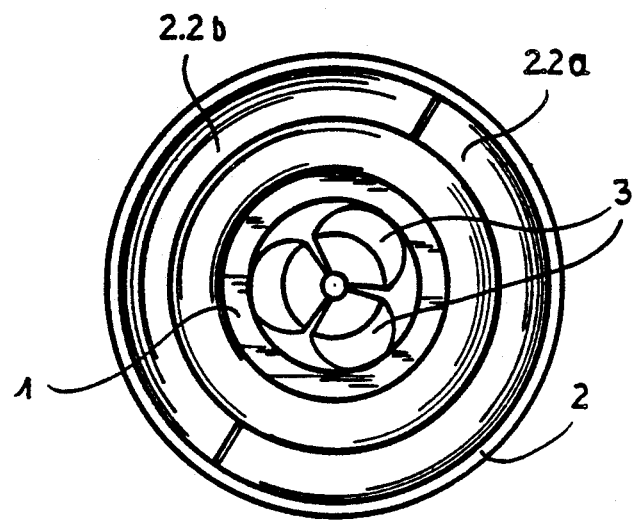
FIG. 3 is an end view of the chuck of FIG. 1.

The drill chuck shown in FIGS. 1 and 3 comprises a chuck body 1 and a tightening ring 2. The clamp jaws 3 are divided into three parts circumferentially and a space for the unshown drill tool is provided between them. The clamp jaws 3 are symmetrically positioned around the axis of rotation 4 of the drill chuck and are guided in guide passages 5 of the chuck body 1 inclined to the axis of rotation 4 so that the axes 6 of the guide passages 5 intersect in front, i.e. in the drill tool.

The tightening ring 2 is mounted coaxial to the rotation axis 4 on the chuck body 1. It is mounted rotatable but axially stationary on the chuck body 1 and is provided with a tightening or clamping thread 7 coaxial with the rotation axis 4 for moving the clamp jaws 3 in their feed direction. This tightening thread 7 is engaged with a row of teeth 8 provided on each clamp jaw 3 so that rotation of the tightening ring 2 causes a movement of the clamp jaws 3 in their guide passages 5.

The clamp jaws 3 are essentially circular cylindrical bolts which are flattened on their sides facing the tightening ring 2 and there are equipped with the rows of teeth 8.

The tightening ring 2 overlaps the end 9 of the chuck body 1 opposite the clamp jaws 3 to the unshown drill spindle and there is provided with an opening 10 for nonrotating connection to the drill spindle. This opening 10 is a threaded opening in this embodiment.

Moreover the chuck body is provided with a passage 11 which is aligned with this opening, through which in case of operation of the drill chuck in a hammer drill the hammering action of the ram can be transferred directly to the drill tool extending between the clamp jaws 3.

The tightening thread 7 has a direction of rotation as viewed in the direction running from the drill spindle toward the clamp jaws such that the clamp jaws 3 are moved to clamp the drill tool more tightly when the tightening ring 2 is rotated clockwise on the chuck body 1. On drilling, the reaction moment of the drill tool tends to lock the clamp jaws 3 and the chuck body 1 against the driving sense of the drill spindle. This reaction moment is thus completely effective in the sense of an automatic tightening on the tightening thread 7 between the clamp jaws 3 and the tightening ring 2.

In the embodiment according to FIG. 1 the tightening ring 2 comprises a tightening sleeve 2.1 having the opening 10 for the drill spindle and the threaded ring 2.2, which, as is usual with ring gear drill chucks, is divided circumferentially into two halves 2.2a, 2.2b. The tightening thread 7 is provided on this threaded ring 2.2. The halves of the threaded ring 2.2 are guided in a circular groove 12 of the chuck body 1 which intersects the guide passages 5 for the clamp jaws 3 so that the threaded ring 2.2 with its tightening thread 7 can come into engagement with the rows of teeth 8 of the clamp jaws 3.

The tightening sleeve 2.1 holds both halves of the threaded ring 2 2 together fitting with each other. The threaded ring 2.2 and the tightening ring 2 with it as a whole is held axially nonshiftable in the circular groove 12. Moreover the tightening sleeve 2.1 is guided on the end 9 of the chuck 1 so that it is at the largest possible spacing from the threaded ring 2.2.

Figure 2:
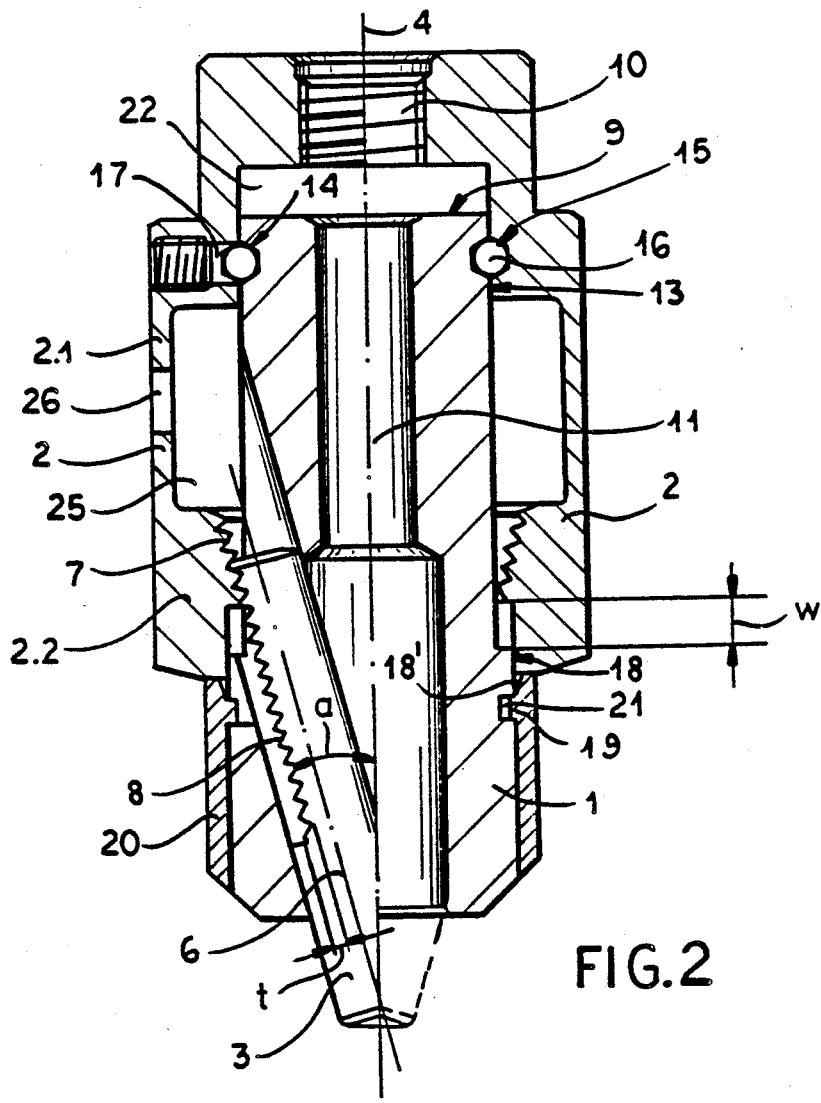
FIG. 2 is an axial cross sectional view through a drill chuck according to my invention with an axially undivided threaded ring.

In the embodiment of FIG. 2 the tightening ring 2 has a one-piece threaded ring 2.2 formed with the tightening sleeve 2.1 on which the tightening thread 7 is formed. The chuck body 1 in the region between the threaded ring 2.2 and the drill-spindle side chuck body 9 has a maximum outer diameter which is at most equal to the inner diameter of the threaded ring 2.2, so that the tightening ring 2 can be pushed axially from above over the chuck body during assembly of the drill chuck.

The tightening ring 2 is guided on a cylindrical surface 13 on the chuck body 1 in which two circular grooves 14 located radially opposite each other are provided, which complete opposite sides of a ring duct 15. In this ring duct 15 the locking members 16 prevent axial movement of the tightening ring 2 from axial motion on the chuck body 1. Thus the ring duct 15 and the locking members 16 form a ball bearing in which the ring duct 15 acts as the bearing race in which the locking members 16 in the form of bearing balls run.

In the wall of the tightening ring 2 a closable radial filling passage 17 is provided, which opens in the ring duct 15 and by which the bearing balls can be fed in the ring duct.

The drill end of the threaded ring 2.2 is equipped axially in front of the tightening thread 7 with a cylindrical inner surface 18, with which the threaded ring additionally is guided on a suitable outer surface 18 of the chuck body 1. A comparatively large axial space is located between this cylindrical inner surface 18 and the cylindrical surface 13 having the ball bearing and/or the cylindrical surface 13' in FIG. 1. This produces good guiding conditions for the tightening ring 2 on the chuck body 1.

As long as the tightening ring 2 is mounted on the chuck body 1 in a condition unsecured from axial sliding, for example when the bearing balls are still not fed into the bearing race, the tightening ring 2 for assembly purposes can be pushed so far forward toward the drill beyond its position illustrated in the secured state in FIG. 2, that the tightening thread 7 is disengaged from the rows of teeth 8 on the clamp jaws 3. If t is the engagement depth of the tightening thread 7 on the row of teeth 8 and $a$ is the inclination angle between the axis 6 of the guide passages 5 for the clamp jaws 3 and the rotation axis 4, the axial displacement $w$ until disengagement of the tightening ring 2 and the clamping jaws 3 is given by $$w = t / \sin a.$$

The tightening ring 2 must be axially pushed forward by the length of this displacement so that assembly is easy. If the tightening ring 2 is pushed forward by the a displacement $w$, the threaded ring 2.2 and the clamp jaws 3 move relative to each other through the distance $t$ perpendicular to the axes 6 of the guide passages 5, so that the tightening ring 2 and the clamp jaws 3 are disengaged. To allow this displacement an empty space 22 is provided axially between the end 9 of the drill chuck 1 and the tightening ring 2.

A sleeve 20 is located in front of the tightening ring 2 on the chuck body 1 in the embodiment of FIG. 1, which is held with a lock stud 19 in a lock seat 21 in the chuck body 1. This sleeve 20 covers the entrances of the guide passages 5 for the clamp jaws 3 in the chuck body 1 where these entrances are not already closed by the tightening ring 2 itself. This sleeve 20 can be installed, after the tightening ring 2 has been mounted on the chuck body 1, and the bearing balls have been fed into the bearing channel or race.

The tightening sleeve 2 has an empty space 25 between the cylindrical surface 13 and the threaded ring 2.2 into which the guide passages 5 open. In this empty ring space drilling waste can collect and can be removed from the drill chuck through the cleaning port 26 in the wall of the tightening ring 2.

I claim:
1. A drill chuck comprising:
   a chuck body centered on a chuck axis and formed with
      a rear end,
      substantially cylindrical rear outer surface centered on the axis adjacent the rear end, and itself formed with an outwardly open annular groove,
      a front end, and
      a plurality of circumferentially spaced angled guides
         opening at the front end of
         the body and laterally intermediate
         the chuck-body ends;
   respective jaws in the guides each formed with a row of teeth exposed at the respective lateral openings between the chuck-body ends;
   a tightening sleeve centered on the chuck axis and formed with a base defining
      a substantially cylindrical rear inner surface riding on the cylindrical rear outer surface of the body and
      formed with an inwardly open annular groove confronting the groove of the body, a forward end, a rear end axially confronting the rear end of the chuck body and formed with a central hole adapted to receive a drill spindle,
      a one-piece front end ring, axially forward said rear inner surface and formed internally with
         a screw thread meshing with the exposed teeth of the
         jaws such that rotation of the
         sleeve about the axis relative to the chuck
         body in one direction urges the jaws axially forward;
   means including at least one coupling element in the grooves axially coupling the sleeve to the body while permitting relative rotation between the sleeve and the body about the axis;
   the portion of said sleeve bore extending between the rear end of the body and the forward end of the sleeve being a first portion, the portion of said body extending between the rear end of the body and the forward end of the sleeve being a second portion, said first portion of said sleeve bore being of a diameter greater than the greatest diameter of the second portion of the body.
2. The improvement defined in claim 1, wherein the grooves and the coupling element together form a ball bearing in which the grooves form a bearing race and the coupling element is a plurality of bearing balls, the sleeve being formed with a radially closable filling passage opening into the grooves and capable of feeding the bearing balls into the grooves.
3. The improvement defined in claim 1, wherein the front end ring has a cylindrical inner surface axially forward of the screw thread, the chuck body having a second cylindrical outer surface axially forward of said guide lateral openings, said axially forward inner surface of said ring riding on said second cylindrical outer surface of said body.

* * * * *